(12) United States Patent
Sarkis et al.

(10) Patent No.: US 11,678,392 B2
(45) Date of Patent: Jun. 13, 2023

(54) SIDELINK COMMUNICATION RECOVERY

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/202,840

(22) Filed: Mar. 16, 2021

(65) Prior Publication Data

US 2021/0298107 A1    Sep. 23, 2021

Related U.S. Application Data

(60) Provisional application No. 62/992,984, filed on Mar. 21, 2020.

(51) Int. Cl.
*H04W 76/19* (2018.01)
*H04W 72/0446* (2023.01)
*H04L 1/00* (2006.01)
*H04W 72/02* (2009.01)
(Continued)

(52) U.S. Cl.
CPC ........... *H04W 76/19* (2018.02); *H04L 1/0063* (2013.01); *H04W 72/02* (2013.01); *H04W 72/0446* (2013.01); *H04W 72/20* (2023.01); *H04W 92/18* (2013.01)

(58) Field of Classification Search
CPC . H04W 76/19; H04W 72/02; H04W 72/0406; H04W 72/0446; H04W 92/18; H04W 76/14; H04L 1/0063; H04L 2001/0093; H04L 2001/0097; H04L 1/0077; H04L 1/0041
See application file for complete search history.

(56) References Cited

U.S. PATENT DOCUMENTS

| 2018/0302889 A1* | 10/2018 | Guo | H04B 7/088 |
| 2019/0020381 A1* | 1/2019 | Tooher | H04W 72/14 |
| 2019/0052412 A1* | 2/2019 | Lopez | H04L 1/1848 |

(Continued)

FOREIGN PATENT DOCUMENTS

WO    WO-2021088081 A1 *   5/2021

OTHER PUBLICATIONS

Merged translation and original of WO-2021088081 (Year: 2021).*
International Search Report and Written Opinion—PCT/US2021/022741—ISA/EPO—dated Jun. 24, 2021.

*Primary Examiner* — Rina C Pancholi
(74) *Attorney, Agent, or Firm* — Patterson + Sheridan LLP

(57) ABSTRACT

Certain aspects of the present disclosure provide techniques for recovering a sidelink communication. A wireless node may receive a plurality of sidelink communications, each sidelink communication between two user equipments (UEs); and transmit recovery information in a recovery slot, wherein the recovery information is for recovery of at least one of the sidelink communications by the two UEs or other UEs that transmitted when at least one of the sidelink communications occurred and wherein the recovery slot is for transmission of the recovery information.

28 Claims, 16 Drawing Sheets

(51) Int. Cl.
*H04W 72/20* (2023.01)
*H04W 92/18* (2009.01)

(56) References Cited

U.S. PATENT DOCUMENTS

| | | | |
|---|---|---|---|
| 2019/0058986 A1* | 2/2019 | Loehr | H04L 1/1825 |
| 2019/0082334 A1* | 3/2019 | Nagaraja | H04W 72/0446 |
| 2019/0090250 A1* | 3/2019 | Lee | H04W 4/40 |
| 2020/0127775 A1* | 4/2020 | Su | H04L 1/1854 |
| 2020/0252990 A1* | 8/2020 | Ganesan | H04W 76/19 |
| 2020/0259600 A1* | 8/2020 | Cao | H04W 72/1289 |

* cited by examiner

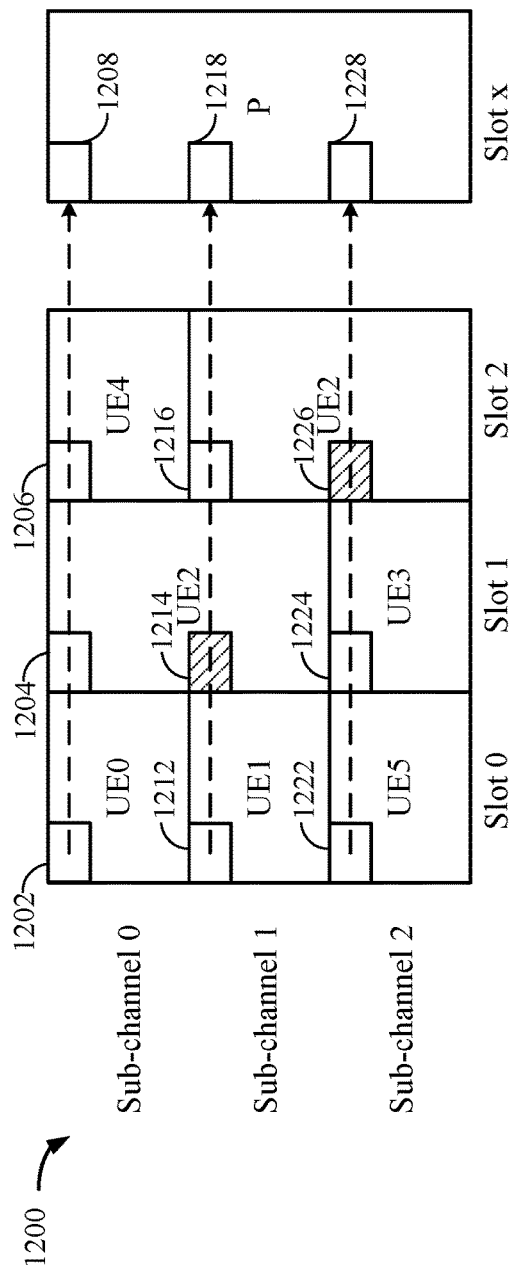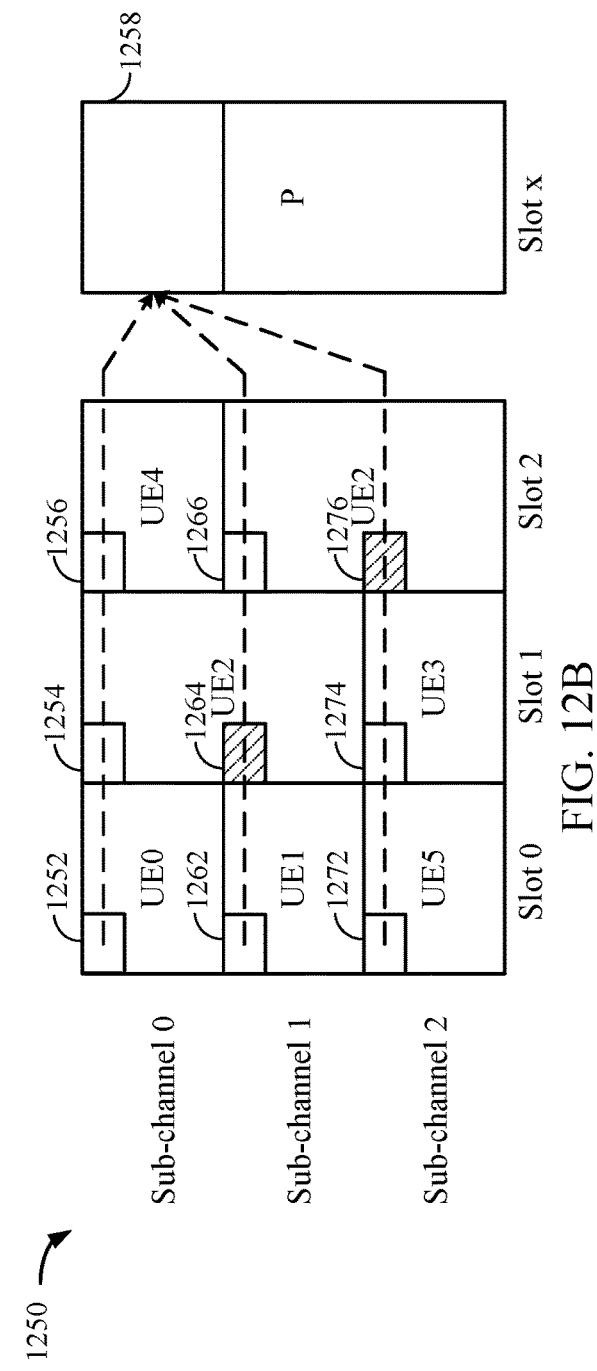

SIDELINK COMMUNICATION RECOVERY

CROSS-REFERENCE TO RELATED APPLICATION

This application claims benefit of and priority to U.S. Provisional Application No. 62/992,984, filed Mar. 21, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for recovering a sidelink communication that is missed by a wireless node due to the wireless node transmitting while the sidelink communication is occurring.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include desirable wireless performance, such as desirable data rates, latency, and/or reliability from sidelink communications.

Certain aspects provide a method for wireless communication by a wireless node. The method generally receiving a plurality of sidelink communications, each sidelink communication between two user equipments (UEs); and transmitting recovery information in a recovery slot, wherein the recovery information is for recovery of at least one of the sidelink communications by the two UEs or other UEs that transmitted when at least one of the sidelink communications occurred and wherein the recovery slot is for transmission of at least the recovery information.

Certain aspects provide a method for wireless communication by a first UE. The method generally includes communicating a sidelink communication with a second UE; receiving recovery information in a recovery slot, wherein the recovery information is for recovery of at least one of the sidelink communications by one or more third UEs that transmitted when the sidelink communication occurred and wherein the recovery slot is for transmission of the recovery information; and determining another sidelink communication transmitted by a wireless node, based on the sidelink communication and the recovery information.

Certain aspects provide an apparatus for wireless communications. The apparatus generally includes a receiver configured to receive a plurality of sidelink communications, each of the sidelink communications being between two UEs. The apparatus also includes a transmitter configured to transmit recovery information in a recovery slot, wherein the recovery information is for recovery of at least one of the sidelink communications by the two UEs or other UEs that transmitted when at least one of the sidelink communications occurred and wherein the recovery slot is for transmission of at least the recovery information.

Certain aspects provide an apparatus for wireless communications. The apparatus generally includes a transceiver, a memory, and a processor. The transceiver is configured to communicate a sidelink communication with a first UE, and receive recovery information in a recovery slot, wherein the recovery information is for recovery of at least one sidelink communication by one or more second UEs that transmitted when the sidelink communication occurred and wherein the recovery slot is for transmission of the recovery information. The processor is coupled to the memory, and the processor and the memory are configured to determine another sidelink communication transmitted by a wireless node, based on the sidelink communication and the recovery information.

Certain aspects provide an apparatus for wireless communications. The apparatus generally includes means for receiving a plurality of sidelink communications, each sidelink communication between two UEs; and means for transmitting recovery information in a recovery slot, wherein the recovery information is for recovery of at least one of the sidelink communications by the two UEs or other UEs that transmitted when at least one of the sidelink communications occurred and wherein the recovery slot is for transmission of at least the recovery information.

Certain aspects provide an apparatus for wireless communications. The apparatus generally includes means for communicating a sidelink communication with a first UE; means for receiving recovery information in a recovery slot, wherein the recovery information is for recovery of at least one of the sidelink communications by one or more second UEs that transmitted when the sidelink communication occurred and wherein the recovery slot is for transmission of the recovery information; and means for determining another sidelink communication transmitted by a wireless node, based on the sidelink communication and the recovery information.

Certain aspects provide a computer-readable medium for wireless communications by a wireless node. The computer-readable medium includes instructions that, when executed by a processing system, cause the processing system to perform operations generally including receiving a plurality of sidelink communications, each sidelink communication between two UEs; and transmitting recovery information in a recovery slot, wherein the recovery information is for recovery of at least one of the sidelink communications by the two UEs or other UEs that transmitted when at least one of the sidelink communications occurred and wherein the recovery slot is for transmission of at least the recovery information.

Certain aspects provide a computer-readable medium for wireless communications by a wireless node. The computer-readable medium includes instructions that, when executed by a processing system, cause the processing system to perform operations generally including communicating a sidelink communication with a first UE; receiving recovery information in a recovery slot, wherein the recovery information is for recovery of at least one of the sidelink communications by one or more second UEs that transmitted when the sidelink communication occurred and wherein the recovery slot is for transmission of the recovery information; and determining another sidelink communication transmitted by a wireless node, based on the sidelink communication and the recovery information.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 12A and 12B are exemplary transmission timelines illustrating sidelink communications with transmission of recovery information for first stage sidelink control information (SCI-1), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
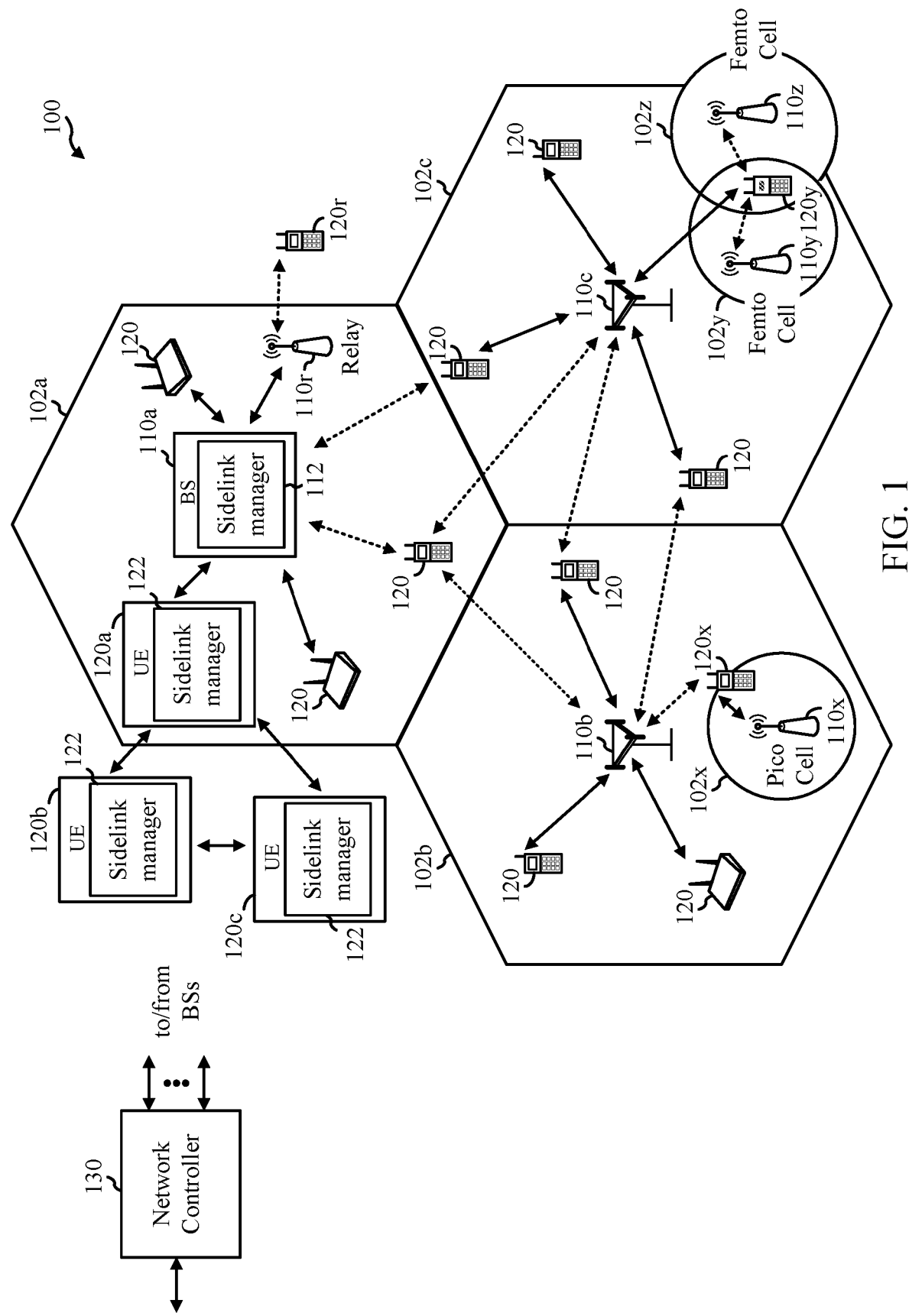
FIG. 1 is a block diagram conceptually illustrating an example telecommunications system, in accordance with certain aspects of the present disclosure.

Aspects of the present disclosure provide apparatus, methods, processing systems, and computer readable mediums for recovering a sidelink communication that is missed by a wireless node due to the wireless node transmitting while the sidelink communication is occurring. When a UE is transmitting a sidelink communication in a frequency band, the UE is typically unable to receive another communication (e.g., another sidelink communication from another UE) in the same frequency band. In aspects of the present disclosure, a wireless node may receive sidelink communications and transmit recovery information in a recovery slot. A UE that was transmitting during the period (e.g., a slot) of the sidelink communications may receive the recovery information and recover (e.g., determine the contents of) the sidelink communications that the UE missed while the UE was transmitting. In some aspects of the present disclosure, the wireless node may generate parity information as the recovery information that a UE can use to recover sidelink communications. In some aspects of the present disclosure, the wireless node may transmit repetitions of the sidelink communications as the recovery information. The techniques for recovering sidelink communications described herein may enable desirable wireless performance, such as desirable data rates, latency, and/or reliability from sidelink communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120a and/or BS 110a of FIG. 1 may be configured to perform operations described below with reference to FIGS. 8-9 to recover a sidelink communication that is received with errors or is missed by a wireless node, for example, due to the wireless node transmitting while the sidelink communication is occurring.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured to recover a sidelink communication that received with errors or is missed by a wireless node, for example, due to the wireless node transmitting while the sidelink communication is occurring. As shown in FIG. 1, the BS 110a includes a sidelink manager 112 that transmits recovery information for sidelink communications to one or more UEs communicating via sidelink channels, in accordance with aspects of the present disclosure. In some examples, the sidelink manager 112 may generate parity information for the sidelink communications as the recovery information. As shown in FIG. 1, the UEs 120a, 120b, 120c include a sidelink manager 122 that may communicate with one or more other UEs via sidelink channels, recover sidelink communications with recovery information from a base station or another UE, and/or generate and transmit recovery information for one or more other UEs, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
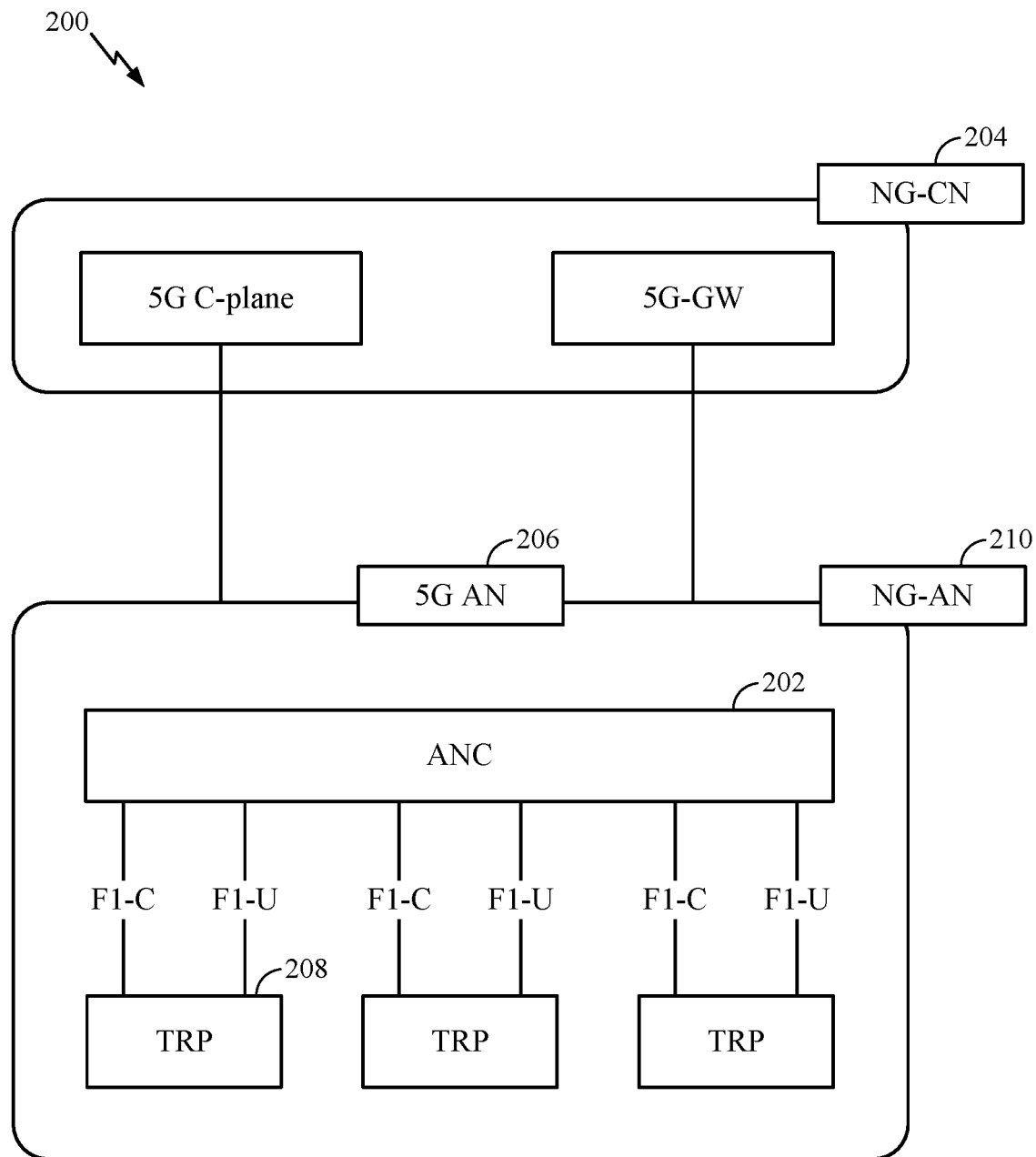
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
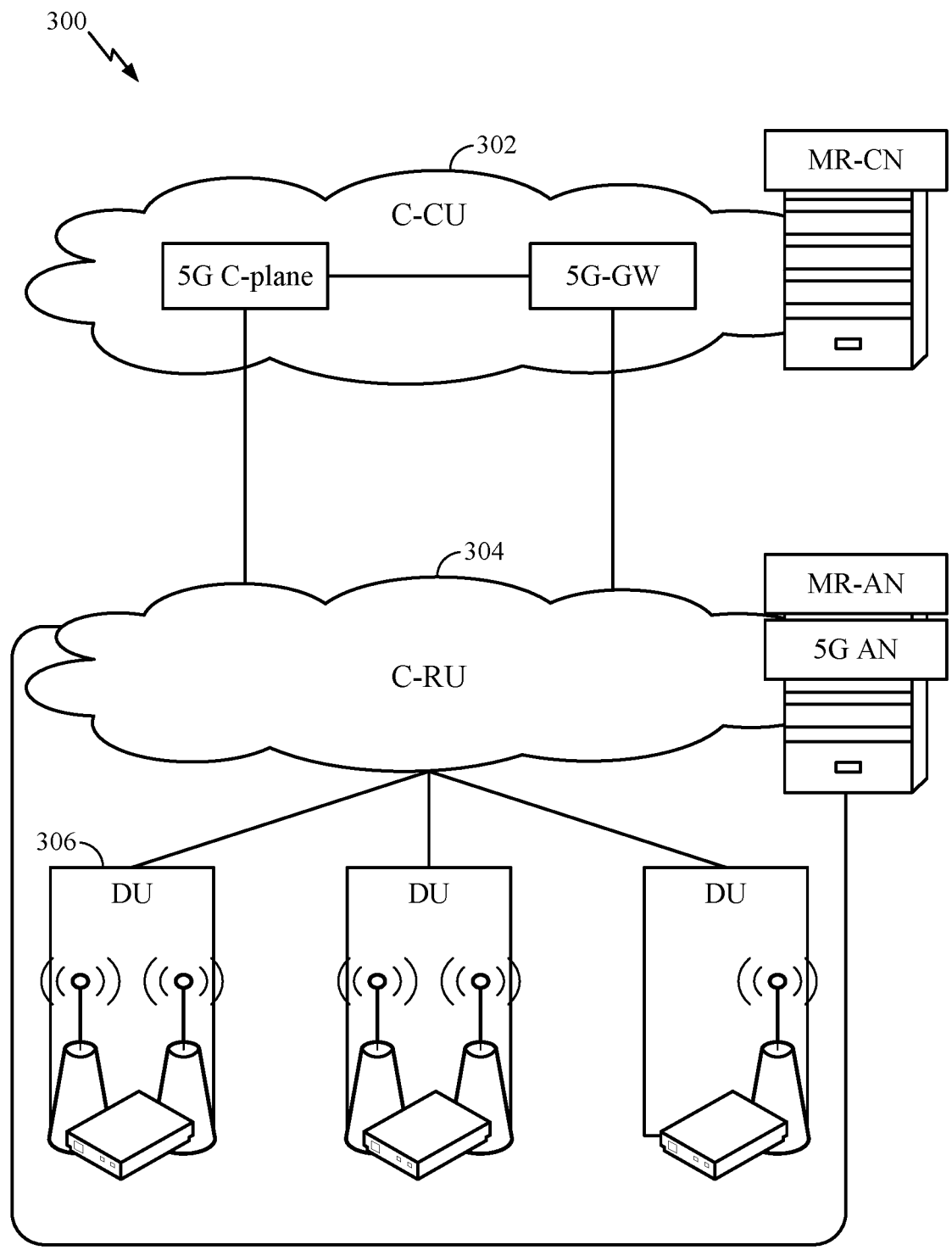
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
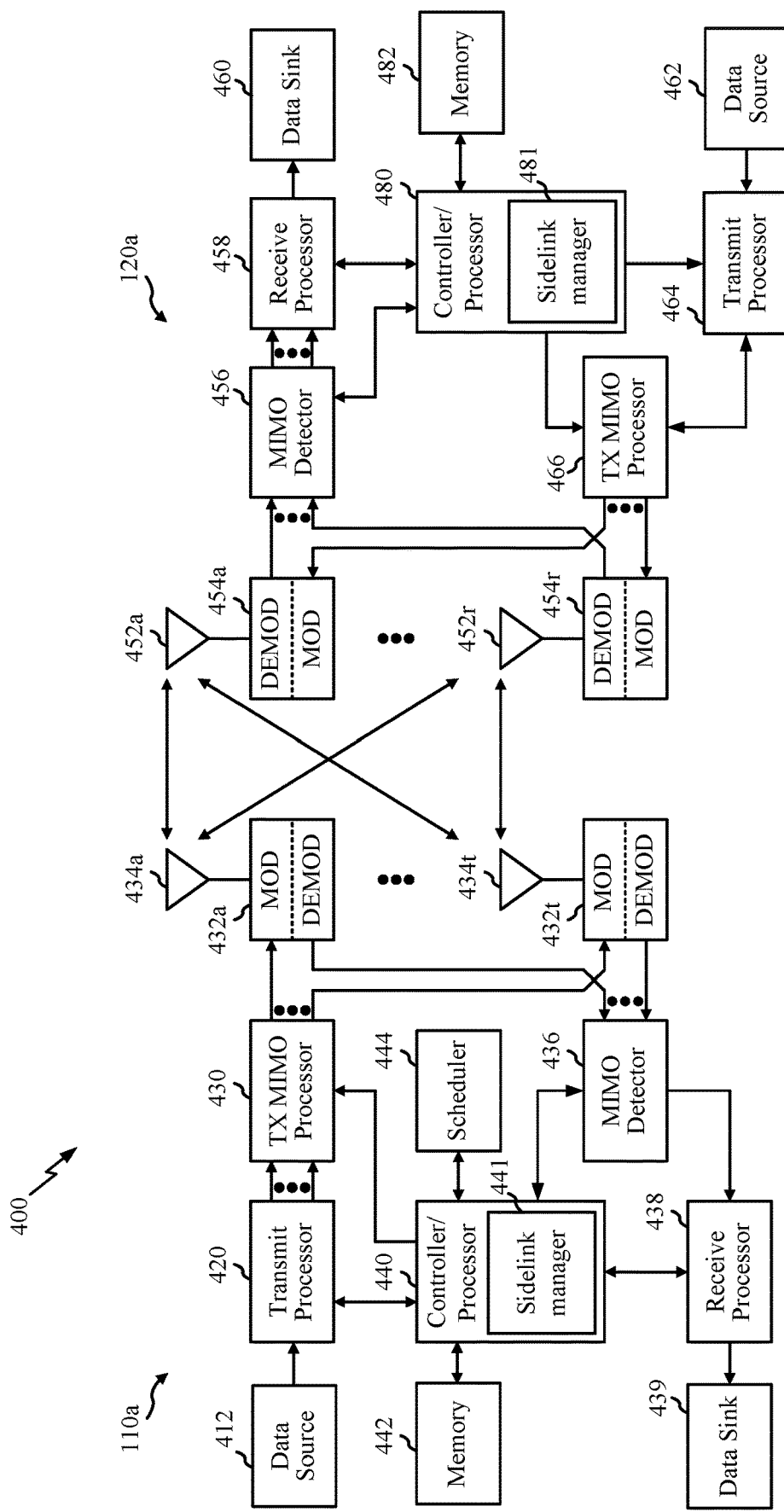
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. For example, antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein with reference to FIGS. 8-9.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the base station 110a and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110a may perform or direct the execution of processes for the techniques described herein. For example, as shown in FIG. 4, the controller/processor 440 of the BS 110a has a sidelink manager 441 that transmits recovery information for sidelink communications to one or more UEs communicating via sidelink channels, according to aspects described herein. As shown in FIG. 4, the controller/processor 480 of the UE 120a has a sidelink manager 481 that may communicate with one or more other UEs via sidelink channels, recover sidelink communications with recovery information from a base station or another UE, and/or generate and transmit recovery information for one or more other UEs, according to aspects described herein. Although shown at the controller/processor 480 and controller/processor 440, other components of the UE 120a and BS 110a may be used performing the operations described herein. The memories 442 and 482 may store data and program codes for BS 110a and UE 120a, respectively. A scheduler 444 may schedule UEs for data transmission on the downlink and/or uplink.

While the UE 120a is described with respect to FIGS. 1 and 4 as communicating with a BS and/or within a network, the UE 120a may be configured to communicate directly with/transmit directly to another UE 120, or with/to another wireless device without relaying communications through a network. In some embodiments, the BS 110a illustrated in FIG. 4 and described above is an example of another UE 120.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
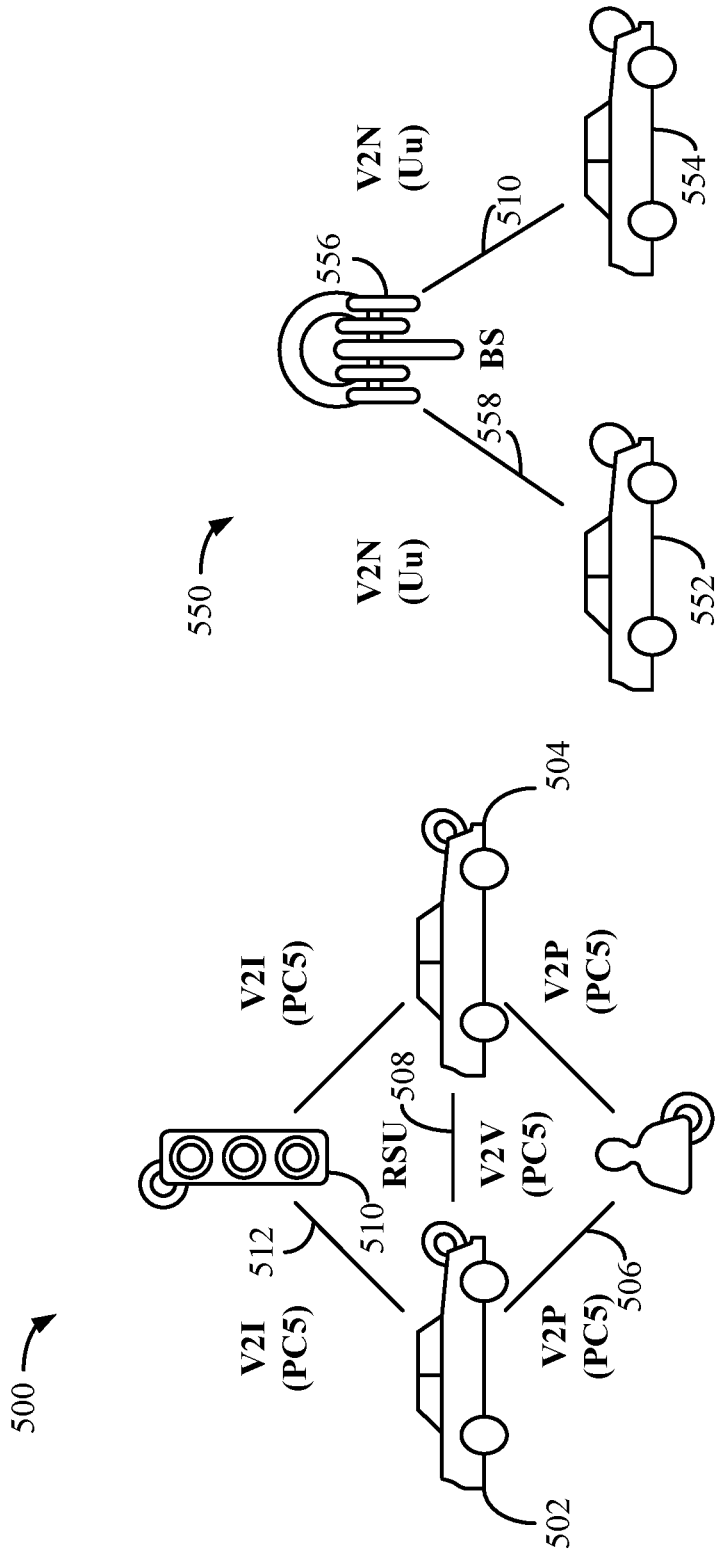
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit (RSU) 510), such as a traffic signal or sign (i.e., vehicle to infrastructure (V21)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
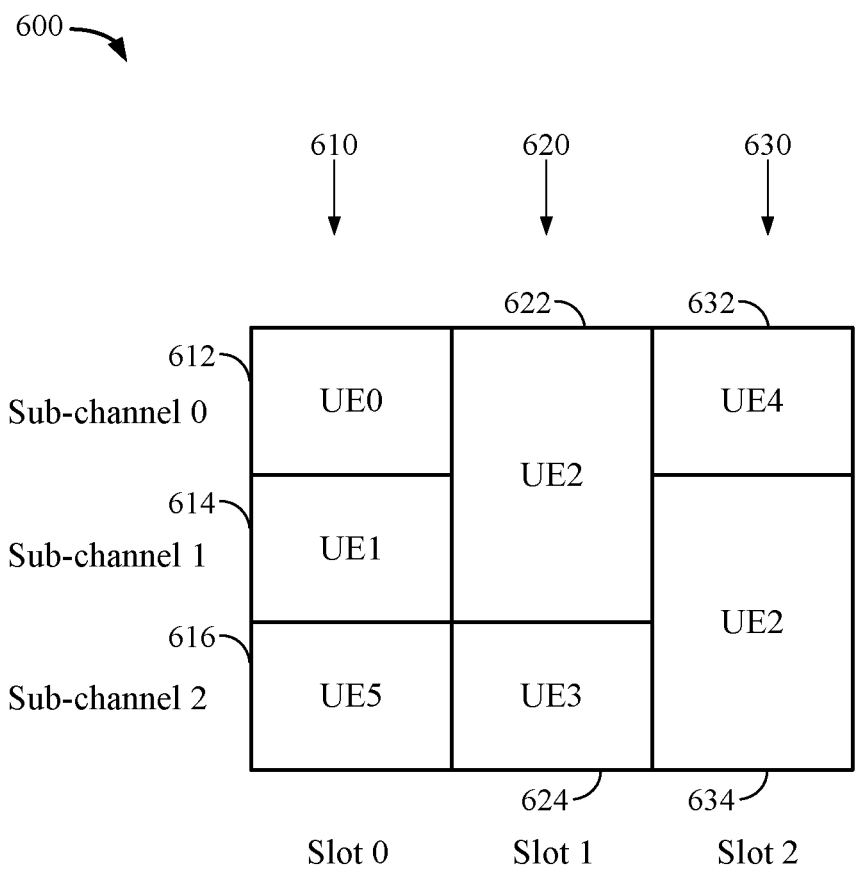
FIG. 6 is an example transmission timeline of sidelink, in accordance with certain aspects of the present disclosure.

FIG. 6 is an example transmission timeline 600 of sidelink communications (broadcast and groupcast device-to-device or D2D) between UEs (e.g., UEs 110, shown in FIG. 1). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. Thus, UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Figure 7:
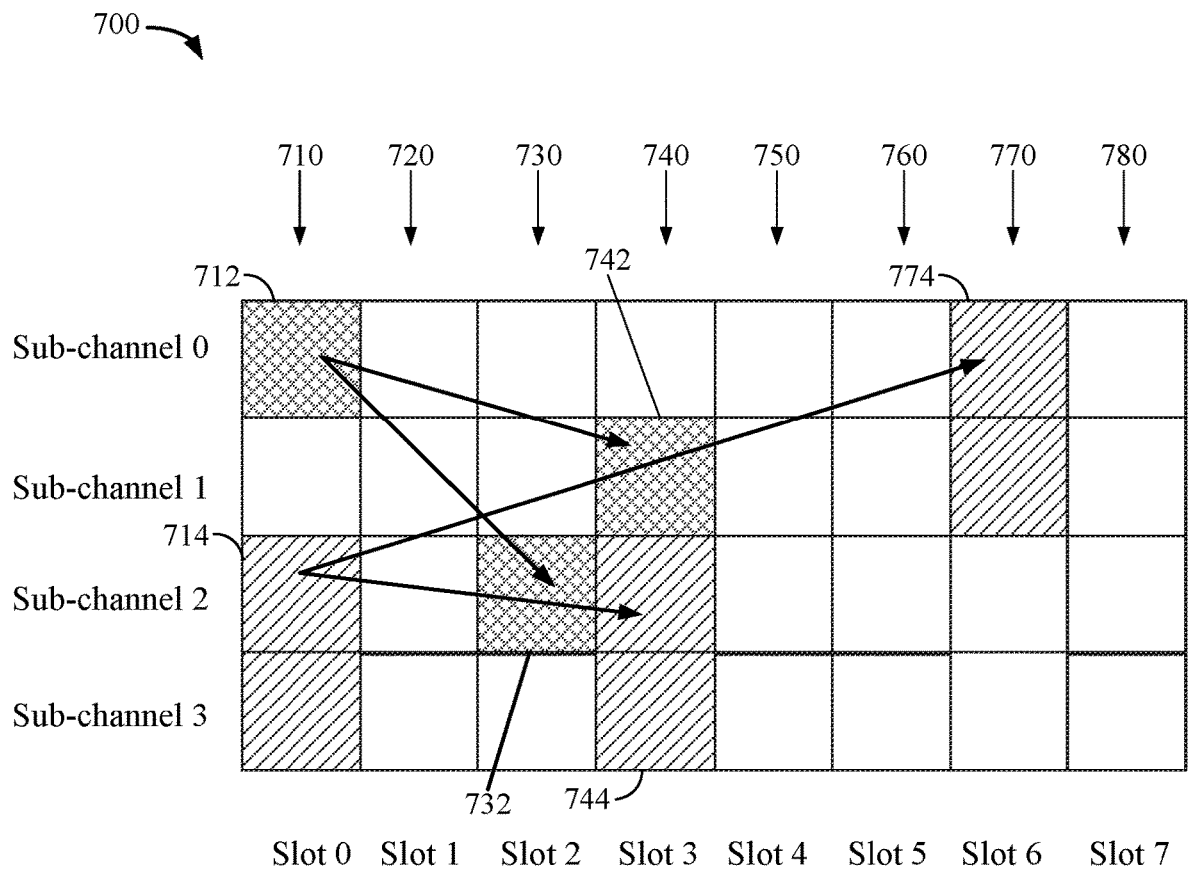
FIG. 7 is an example transmission timeline illustrating sidelink resource reservation, according to previously known techniques.

FIG. 7 is an example transmission timeline 700 illustrating sidelink resource reservation, according to previously known techniques. A SCI-1 transmitted by a UE at 712 may reserve resources at 712, 732, and 742. Similarly, another SCI-1 transmitted by a UE at 714 may reserve resources at 744 and 774.

According to previously known techniques, data can be encoded using erasure coding to enable a receiving device to recover a portion of data, which is erased from a transmission. That is, an erasure code or error correction code may be used to transform data such that a receiver can recover the original data from a portion of the data. Single parity check codes can correct one erasure. For example, when an input vector is [a, b, c], a single parity check code may be used to encode the input vector to form a coded vector [a, b, c, a⊕b⊕c] that is then transmitted. In the example, any single erasure can be recovered, e.g., if the received vector is [a, ?, c, a⊕b⊕c], then erased element (i.e., b) can be recovered by summing the other received elements: a⊕c⊕(a⊕b⊕c)=b. This can be viewed as a linear system (over a Galois field) with three variables and any three of the four constraints are linearly independent:

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T$$

Any three constraints (i.e., there is one erasure among the four constraints) are sufficient to find the three variables.

Other forms of erasure coding may be used to enable recovery of two or more erasures. Reed-Solomon and other maximum-distance separable (MDS) codes may enable recovery of two or more erasures. In certain aspects, an erasure code may include a parity check code, a Reed-Solomon code, and/or an MDS code. In certain cases, the erasure code may include other suitable codes, such as a Raptor code or the like. In general, an erasure code can be designed such that any k symbols of an n-symbol codeword are sufficient to decode the k information symbols. For example, the below illustrated erasure code can be used to recover up to two erasures:

$$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix} \cdot [a \ b \ c]^T = [a \ b \ c \ a \oplus b \oplus c \ \alpha \oplus \alpha \cdot b \oplus \alpha^2 \cdot c]^T$$

Example Sidelink Communication Recovery

Aspects of the present disclosure provide apparatus, methods, processing systems, and computer readable mediums for recovering a sidelink communication that is received with errors or is missed by a wireless node, for example, due to the wireless node transmitting while the sidelink communication is occurring. In certain cases, a UE may be configured to communicate via half-duplex communications for sidelink communications. In other cases, the UE may only support half-duplex communications for sidelink communications. When a UE is transmitting a sidelink communication in a frequency band, the UE may be unable to receive another communication (e.g., another sidelink communication from another UE) in the same frequency band, for example, due to the half-duplex support and/or configuration for sidelink communications. In certain cases, a UE may receive a sidelink communication with errors, for example, due to undesirable channel quality or mobility scenarios. In aspects of the present disclosure, a wireless node may receive sidelink communications and transmit recovery information in a recovery slot. A UE that was transmitting during the period (e.g., a slot) of the sidelink communications may receive the recovery information and recover (e.g., determine the contents of) the sidelink communications that the UE received with errors or missed while the UE was transmitting. In some aspects of the present disclosure, the wireless node may generate parity information and/or other erasure code information (e.g., redundancy information) as the recovery information that a UE can use to recover sidelink communications. In some aspects of the present disclosure, the wireless node may transmit repetitions of the sidelink communications as the recovery information. The techniques for recovering sidelink communications described herein may enable desirable wireless performance, such as desirable data rates, latency, and/or reliability from sidelink communications.

Figure 8:
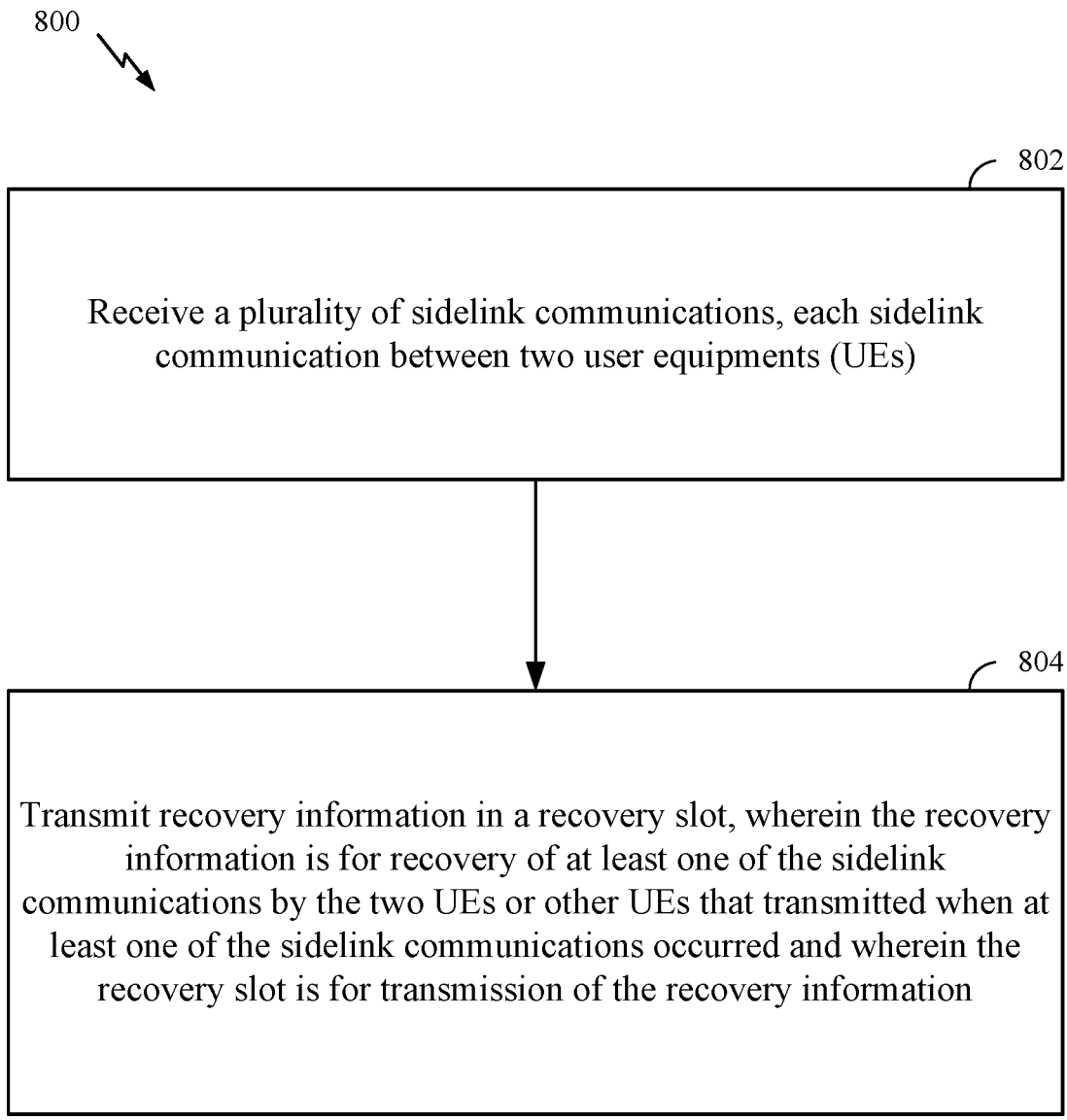
FIG. 8 is a flow diagram illustrating example operations that may be performed by a wireless node, in accordance with certain aspects of the present disclosure.

FIG. 8 is a flow diagram illustrating example operations 800 that may be performed by a wireless node, in accordance with certain aspects of the present disclosure. For example, operations 800 may be performed by a UE, BS, or RSU as shown in FIG. 1, 4, or 5A. As used herein, a wireless node may refer to a wireless communication device, such as a UE, BS, or RSU.

Operations 800 begin, at block 802, where the wireless node may receive a plurality of sidelink communications, each sidelink communication between two user equipments (UEs). At block 804, the wireless node transmits recovery information in a recovery slot, wherein the recovery information is for recovery of at least one of the sidelink communications by the two UEs or other UEs that transmitted when at least one of the sidelink communications occurred and wherein the recovery slot is for transmission of the recovery information. While the operations 800 are described herein with respect to a wireless node that transmits recovery information and is separate from the UEs communicating via sidelink communications to facilitate understanding, aspects of the present disclosure may be applied to a transmitter of the sidelink communications also transmitting the corresponding recovery information for such sidelink communications.

Figure 9:
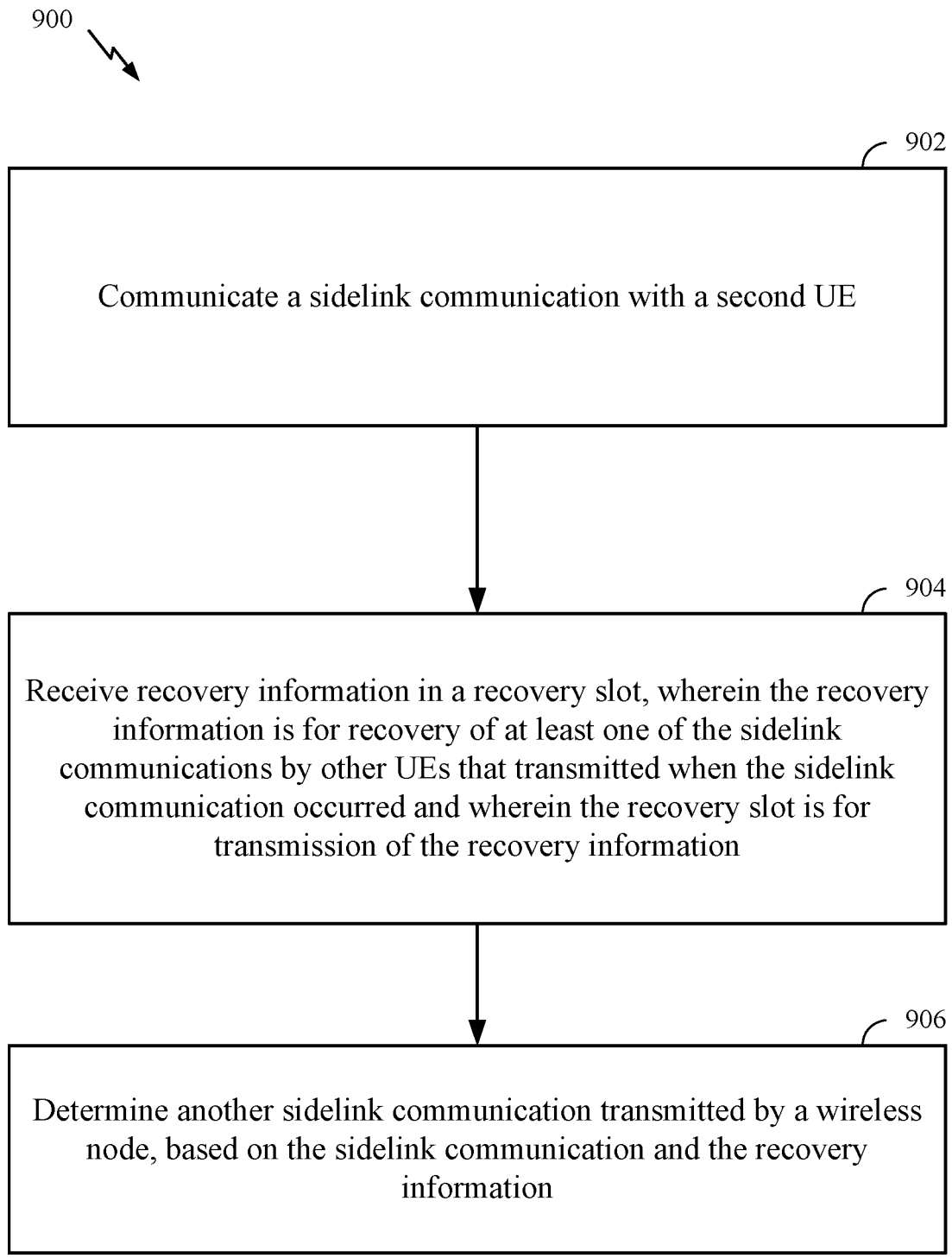
FIG. 9 is a flow diagram illustrating example operations that may be performed by a UE, in accordance with certain aspects of the present disclosure.

FIG. 9 is a flow diagram illustrating example operations 900 that may be performed by a UE, in accordance with certain aspects of the present disclosure. For example, operations 900 may be performed by a UE or base station shown in FIGS. 1, 4, 5A and 5B.

Operations 900 begin, at block 902, where the first UE may communicate a sidelink communication with a second UE. In aspects, the first UE communicating with the second UE may involve the first UE transmitting and/or receiving the sidelink communication to and/or from the second UE. At block 904, the first UE receives recovery information in a recovery slot, wherein the recovery information is for recovery of at least one of the sidelink communications by one or more third UEs that transmitted when the sidelink communication occurred and wherein the recovery slot is for transmission of the recovery information. At block 906, the first UE determining another sidelink communication transmitted by a wireless node (e.g., a UE, BS, or RSU), based on the sidelink communication and the recovery information. In aspects, the wireless node at block 906 may include the second UE, one of the third UEs, and/or a separate wireless node, such as another UE, BS, or RSU.

According to aspects of the present disclosure, slot-level erasure coding may be used to enable recovery of missed (e.g., erased) sidelink communications or recovery of sidelink communication that were received with errors. Recovering missed sidelink communications or recovering a sidelink communication with errors may be an example of determining another sidelink communication, as described above in block 906 of FIG. 9.

Figure 10:
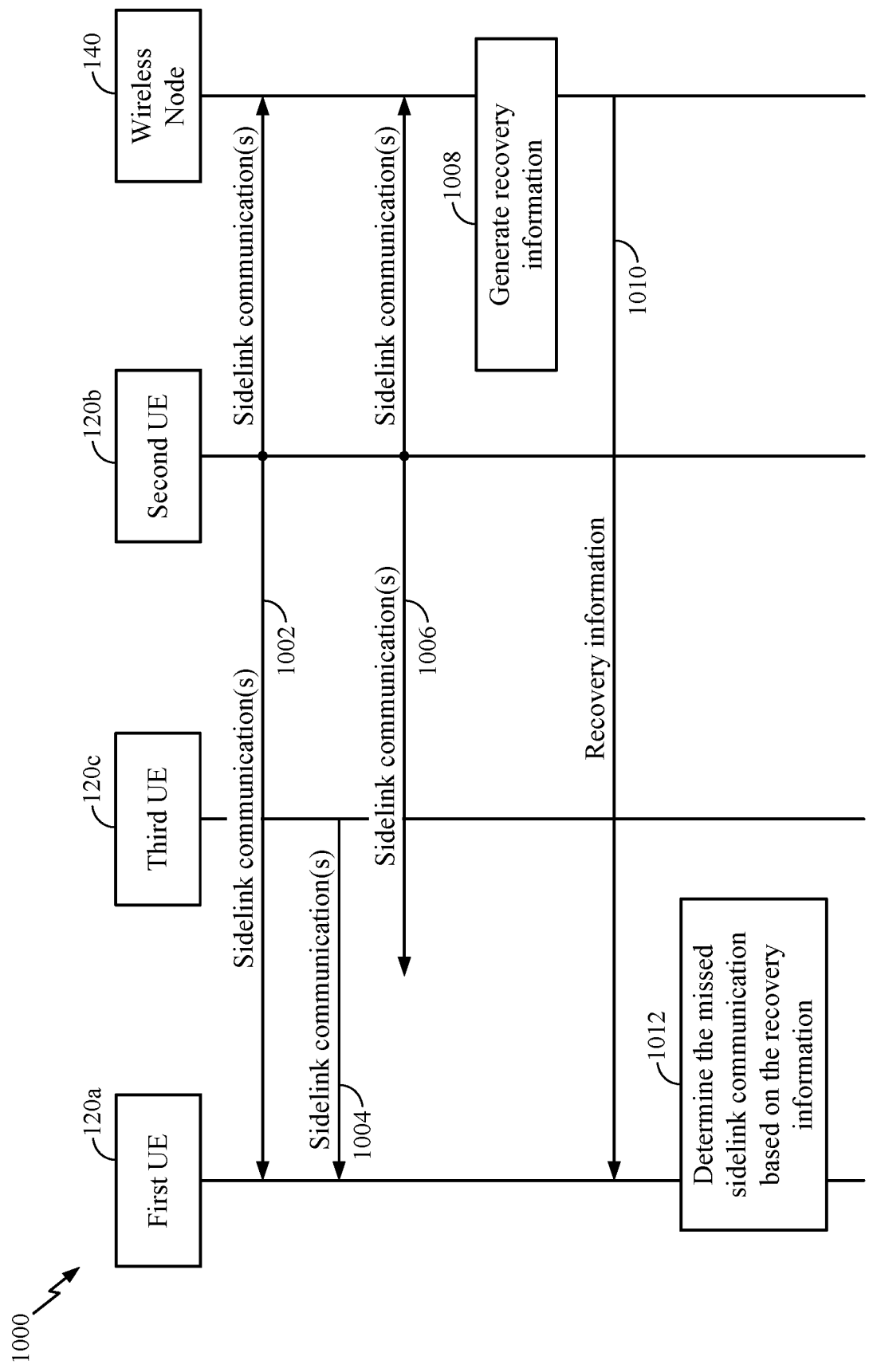
FIG. 10 is a signaling flow illustrating an example signal flow for recovering sidelink communications, in accordance with certain aspects of the present disclosure.

FIG. 10 is a signaling flow illustrating example signaling for recovering sidelink communications, in accordance with certain aspects of the present disclosure. In this example, at 1002, a first UE 120a receives one or more first sidelink communications from a second UE 120b, and a wireless node 140 (which may be another UE, BS, RSU, or a group leader for sidelink communications, for example) may also receive the first sidelink communication(s). At 1004, the first UE 120a may receive one or more second sidelink communications from a third UE 120c. At 1006 in the same time-domain resource unit (e.g., a slot) as the second sidelink communication(s), the second UE 120b may transmit one or more third sidelink communications, where the first UE 120a may miss receiving the third sidelink communication(s), for example, due to half-duplex support and/or configuration for sidelink communications. In certain cases, at 1006, the first UE 120a may receive the third sidelink communication(s) with errors. At 1006, the wireless node 140 may receive the third sidelink communication(s) from the second UE 120b. At 1008, the wireless node 140 may generate recovery information for the sidelink communications transmitted by the second UE 120b, for example, via one or more erasure codes. In aspects, the wireless node 140 may select the sidelink communications (such as TBs and/or SCI payloads) for grouping and/or duplication for generating the recovery information based on the various criteria further described herein. At 1010, the wireless node 140 may transmit the recovery information to the first UE 120a, and at 1012, the UE 120 may use the recovery information to recover the missed third sidelink communication(s) or the third sidelink communication(s) that was/were received with errors. While this example is described herein with respect to the wireless node 140 transmitting the recovery information to facilitate understanding, aspects of the present disclosure may be applied to the second UE and/or third UE generating and transmitting the recovery information.

In aspects of the present disclosure, one or more slots that provide redundancy to prior transmissions thus, e.g., forming an MDS code, may be used for sidelink communication recovery. Slots with recovery information may enable receiver UEs to use information from slots when the UEs were receiving and the recovery information to recover transmissions erased, for example, due to the half-duplex aspect of sidelink communications.

Figure 11:
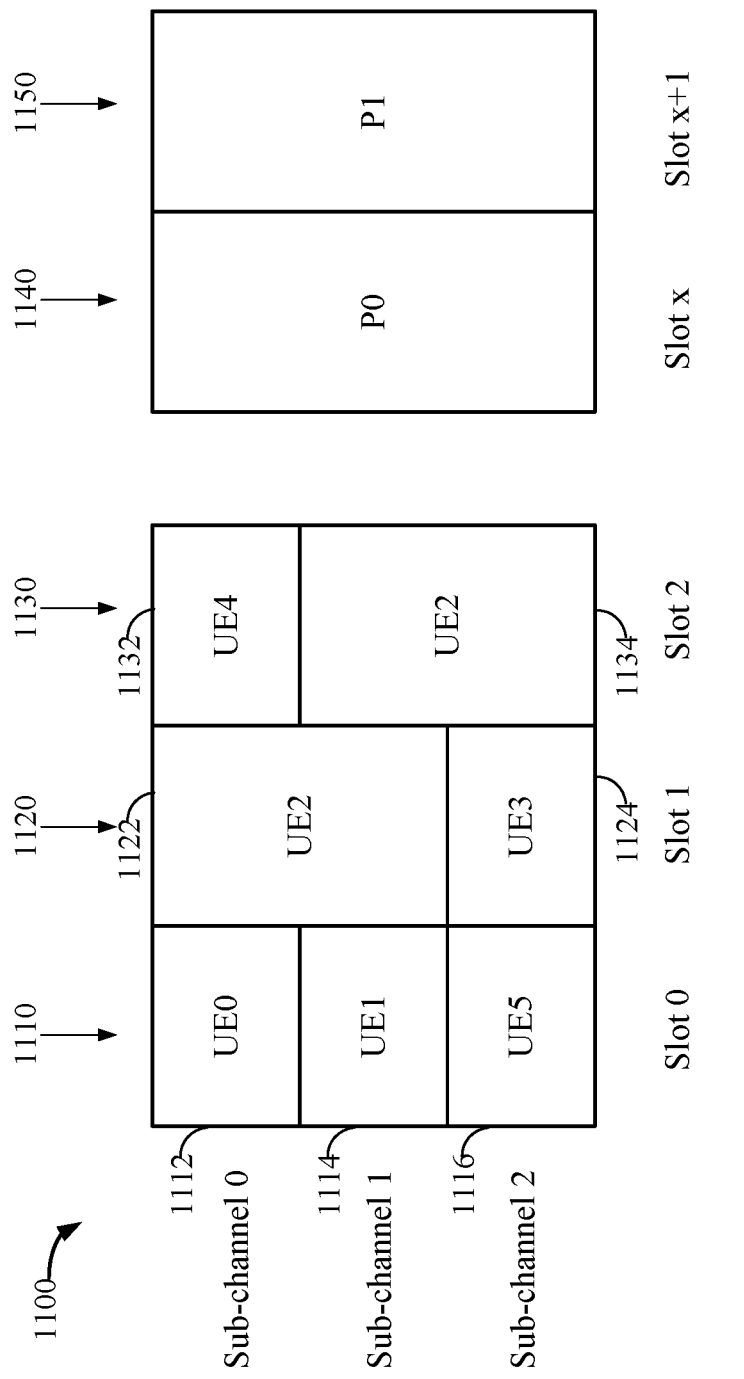
FIG. 11 is an example transmission timeline of sidelink communications with transmission of recovery information, in accordance with certain aspects of the present disclosure.

FIG. 11 is an example transmission timeline 1100 of sidelink communications (broadcast and groupcast device-to-device or D2D) between UEs (e.g., UEs 110, shown in FIG. 1), according to aspects of the present disclosure. As previously described with reference to FIG. 6, UEs 0, 1, and 5, which transmit sidelink communications 1112, 1114, and 1116, respectively, each cannot receive the sidelink communications from each other. That is, UE 0 cannot receive the sidelink transmissions 1114 and 1116. Similarly, UE 2 cannot receive the sidelink transmissions 1124 and 1132 from UEs 3 and 4, respectively. Also, UE 3 cannot receive sidelink transmission 1122 from UE 2, and UE 4 cannot receive the sidelink transmission 1134 from UE 2. In aspects of the present disclosure, a wireless node may transmit recovery information in later slots 1140 or 1150. Each UE may use the recovery information with information regarding the UE's own transmission(s) and transmissions received in the slots 1110, 1120, and 1130 to recover sidelink transmissions missed or received with errors by the UE, e.g., because the UE was transmitting during one or more of slots 1110, 1120, or 1130.

As previously described with reference to FIG. 7, a SCI-1 transmission can carry reservation information for up to 2 future transmissions. Therefore, it is beneficial for a wireless node to recover a missed SCI-1 or recover a received SCI-1 with errors, even if data is not recovered, to avoid collisions and improve reliability by receiving those reservations for the future transmissions.

According to aspects of the present disclosure, there is typically one SCI-1 size in a resource pool.

In aspects of the present disclosure, a wireless node may apply erasure coding (i.e., to generate recovery information, as described in FIG. 8) across slots to SCI-1 transmissions that are within a single sub-channel.

According to aspects of the present disclosure, different slots can have a different number of transmitted PSCCHs, and a wireless node encoding the PSCCHs (and the SCI-1 in the PSCCHs) may use dummy bits (e.g., all zeros) for slots that do not have an SCI-1 in the sub-channel.

In aspects of the present disclosure, a UE receiving the recovery information may determine that an SCI-1 in a sub-channel in a slot does not exist, based on dummy bit values, an invalid CRC, or an explicit indication (e.g., a field in the recovery information or another transmission) from the transmitter of the recovery information.

FIG. 12A is an exemplary transmission timeline 1200, according to aspects of the present disclosure. In the exemplary transmission timeline, a wireless node (e.g., a UE not shown) receives PSCCHs 1202, 1204, and 1206 that are all transmitted in sub-channel 0 and transmits recovery information for those PSCCHs in sub-channel 0 at 1208. Similarly, the wireless node receives PSCCHs 1212 and 1216 that are transmitted in sub-channel 1 and transmits recovery information 1218 for PSCCHs 1212 and 1216. Because a PSCCH is not transmitted at 1214 (as symbolized by the cross-hatching), the wireless node may use dummy bits for the non-existent PSCCH in generating the recovery information at 1218. Similarly, the wireless node receives PSCCHs 1222 and 1224 and may use dummy bits for the non-existent PSCCH at 1226 in generating the recovery information 1228.

According to aspects of the present disclosure, a wireless node may collect all SCI-1s (e.g., from PSCCHs) in a set of sub-channels over a period of slots and transmit recovery information for all of the SCI-1s in a single transmission (e.g., a medium access control control element (MAC-CE)). That is, the wireless node may combine the SCI-1 messages received in a set of sub-channels over a period of slots, where the recovery information may include the combined SCI-1 messages, and the wireless node may transmit the recovery information in a single transmission such as an MAC-CE or other control signaling.

FIG. 12B is an exemplary transmission timeline 1250, according to aspects of the present disclosure. In the exemplary transmission timeline, a wireless node (e.g., a UE not shown) receives PSCCHs 1252, 1254, 1256, 1262, 1266, 1272, and 1274 that are transmitted in sub-channels 0, 1, and 2 and transmits recovery information for those PSCCHs in sub-channel 0 at 1258. Because a PSCCH is not transmitted at 1264 (as symbolized by the cross-hatching) and at 1276, the wireless node may use dummy bits for the non-existent PSCCHs in generating the recovery information at 1258.

According to aspects of the present disclosure, erasure coding may be applied to data transmissions (e.g., on a shared channel (SCH)) to enable recovery of missed (e.g., erased) sidelink data communications or recovery of received sidelink communications with errors.

In aspects of the present disclosure, SCH TBs can be of different sizes. Two data transmissions that span a same number of sub-channels can have different-size TBs, because the transmissions can be transmitted with different modulation and coding schemes (MCSs). Data transmissions can be transmitted using different redundancy versions (RVs) or span a different number of sub-channels. Thus, it is not desirable to apply the simple coding across TBs that is described above as applying to SCI-1s.

According to aspects of the present disclosure, a wireless node may encode and combine sidelink data transmissions to generate recovery information for sidelink data transmissions.

In aspects of the present disclosure, a wireless node may simply relay (e.g., repeat) a sidelink data transmission as recovery information for that sidelink data transmission.

According to aspects of the present disclosure, it is desirable when combining data transmissions to generate recovery information to combine data transmissions that are in different slots. Combining data transmissions from different slots makes it less probable that a UE will miss more than two of the combined data transmissions (because the data transmissions are in different slots), and thus more probable that the UE will be able to recover the missed data transmissions or recover data transmissions with errors using the recovery information.

In aspects of the present disclosure, a wireless node may group TBs from data transmissions, encode the TBs of a group using an erasure code (e.g., an MDS code) to generate an encoded group, encode the encoded group using a low-density parity check (LDPC) code to generate recovery information, and then transmit the recovery information. In aspects, the encoded group may include redundancy symbol (s) and/or parity symbol(s). That is, the wireless node may encode the TBs in the group using an erasure code to generate redundancy symbol(s) and/or parity symbol(s). In certain aspects, the encoded group may be the recovery information such that the wireless node may encode the TBs in the group using an erasure code (e.g., an MDS code) to generate the recovery information. For example, the group of TBs may be encoded to generate a parity symbol P0, which is the recovery information. Then, the parity symbol P0 may be encoded using LDPC and transmitted to other UEs.

According to aspects of the present disclosure, a wireless node may group TBs from data transmissions, encode the TBs of a group using an LDPC code, encode the LDPC-encoded TBs within the group using an erasure code (e.g., an MDS code) to generate recovery information, and transmit the recovery information. In aspects of the present disclosure, the encoded TBs within a group may be rate-matched to a same number of coded bits.

In aspects of the present disclosure, the cyclic redundancy check (CRC) of each TB may be treated as part of the TB and combined with all of the CRCs of all of the TBs.

According to aspects of the present disclosure, a wireless node may remove the CRC from each TB and generate a new CRC for the combined TBs in a group, padding TBs to all have a same size, if necessary.

In aspects of the present disclosure, a wireless node may group TBs, each from a different slot, to generate recovery information for the TBs in the group.

Figure 13:
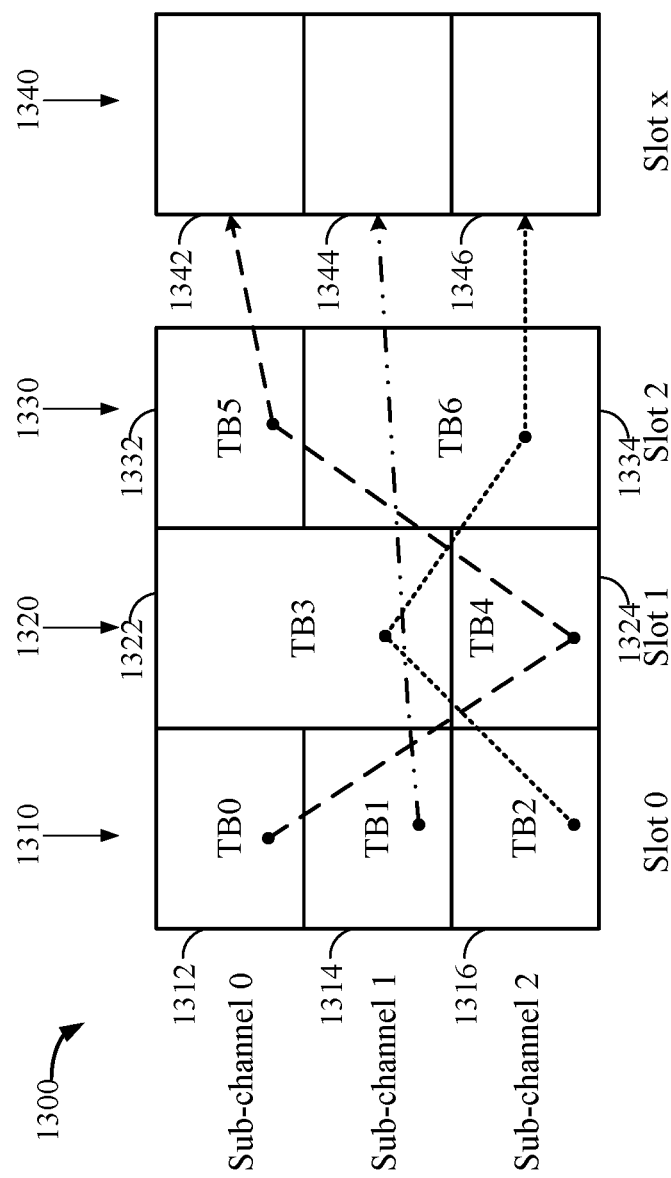
FIG. 13 is an exemplary transmission timeline illustrating sidelink communications with grouping of transport blocks (TBs) for generating recovery information, in accordance with certain aspects of the present disclosure.

FIG. 13 is an exemplary transmission timeline 1300, according to aspects of the present disclosure. In the exemplary transmission timeline, a wireless node (e.g., a UE not shown) receives TBs 1312, 1314, and 1316 that are all transmitted in the slot 1310, TBs 1322 and 1324 that are transmitted in the slot 1320, and TBs 1332 and 1334 that are transmitted in the slot 1330. In the exemplary transmission timeline, the wireless node groups the TBs 1312, 1324, and 1332 and generates recovery information based on those TBs that the wireless node transmits at 1342. Similarly, the wireless node groups the TBs 1316, 1322, and 1334 and generates recovery information based on those TBs that the wireless node transmits at 1346. Finally, in the exemplary transmission timeline, the wireless node groups the TB 1314 by itself and generates recovery information based on that TB that the wireless node transmits at 1344. It may be noted that each group of TBs includes at most one TB from each of the slots 1310, 1320, and 1330.

In aspects of the present disclosure, it may be desirable for a wireless node to group TBs based on reducing a number of padding bits that are added during generating recovery information. Thus, in the exemplary transmission timeline 1300, the recovery information 1342 is generated based on TBs that each occupy one sub-channel in one slot, while the recovery information 1346 is generated based on two TBs that each occupy two sub-channels in one slot. Finally, the recovery information 1344 is based on a transmission that occupies one sub-channel in one slot. This grouping uses a smaller amount of padding bits than groups in which the TBs 1322 and 1334 are in different groups with other TBs that occupy one sub-channel in one slot.

According to aspects of the present disclosure, a wireless node may group TB s based on sizes of the TBs and add zero-padding or additional parity information (e.g., parity bits) within each group.

In aspects of the present disclosure, a wireless node may group TBs based on a layer one (L1) destination identifier (ID) of each TB.

According to aspects of the present disclosure, a wireless node may group TBs based on a starting sub-channel used to transmit each of the TBs. In the exemplary transmission timeline 1300, TBs 1312, 1322, and 1332 may be grouped based on each TB starting in sub-channel 0.

In aspects of the present disclosure, a wireless node may group TBs while excluding high-priority TBs. This may be desirable because high-priority TBs are transmitted repeatedly.

According to aspects of the present disclosure, a wireless node may group TBs based on a signal in an SCI-2 or a MAC-CE that indicates which TBs are to be grouped together.

In aspects of the present disclosure, a wireless node may group TBs based on combination of the various criteria described above.

According to aspects of the present disclosure, a wireless node may determine to group and generate recovery information for (e.g., erasure encode) a subset of sidelink transmissions. The wireless node may determine which TBs are included for generating recovery information based on indications in a SCI-2 or a MAC-CE.

In aspects of the present disclosure, the choice of which TBs to include in generating recovery information can be based on priority of the TBs, an amount of remaining time in a packet delay budget (PDB), whether the wireless node had a CRC pass or fail when receiving the PSSCHs conveying the TBs, and/or size of the TBs (i.e., transport block size (TBS)).

According to aspects of the present disclosure, when performing LDPC encoding of TBs, as described above, the wireless node may use the RV=0 redundancy version for each TB.

In aspects of the present disclosure, when performing LDPC encoding of TBs, as described above, the wireless node may use the RV used in the original transmission (e.g., the sidelink transmission) of the TB.

According to aspects of the present disclosure, a wireless node may generate recovery information by concatenating all TBs in a slot to form a group TBs for each corresponding slot of the sidelink communications, padding or repeating some TBs in the group of TBs to form a padded group such that the group has a size consistent with sizes of groups from other slots, combining the groups of TBs across slots, and then generating recovery information (e.g., using an MDS code) for the combination of the groups across the slots. In these aspects, a UE using the recovery information decodes all TBs (even in normal slots), not just the TBs addressed to the UE.

The size of a SCI-2 can be different between in different slots, though with both a limited range and granularity when compared to the SCH.

According to aspects of the present disclosure, a wireless node may include SCI-2 content as part of SCH before generating recovery information for the SCH.

In aspects of the present disclosure, a wireless node may group (e.g., using one or more criteria described above for grouping TBs) SCI-2s (such as SCI-2 payloads) received in sidelink transmissions, generate recovery information for SCI-2s within a group using an erasure code (e.g., an MDS code), encode the recovery information using a polar code, and transmit the encoded recovery information.

According to aspects of the present disclosure, a wireless node may group (e.g., using one or more criteria described above for grouping TBs) SCI-2s received in sidelink transmissions, encode the SCI-2s in a group using a polar code, encode the polar encoded SCI-2s within the group using an erasure code (e.g., an MDS code) to generate recovery information, and transmit the recovery information.

In aspects of the present disclosure, a wireless node may exclude SCI-2s when generating recovery information for SCI-1s or sidelink data transmissions.

According to aspects of the present disclosure, a wireless node may generate recovery information by duplicating certain sidelink transmissions from a particular time-domain resource unit (e.g., a slot). That is, the wireless node may transmit the recovery information that includes duplications (i.e., repetitions) of certain sidelink transmissions. With respect to the operations 800, the recovery information may include one or more duplications of the plurality of sidelink communications. The slot to repeat can be selected based on a number of high priority transmissions in the slot, a number of UEs impacted by missing (i.e., not receiving during) the slot, a number of remaining retransmissions for TBs in the slot, or a proximity of the wireless node to a UE transmitting during the slot. In aspects of the present disclosure, a wireless node may determine proximity to a UE using zone ID or reference signal received power (RSRP) from the UE.

Figure 14:
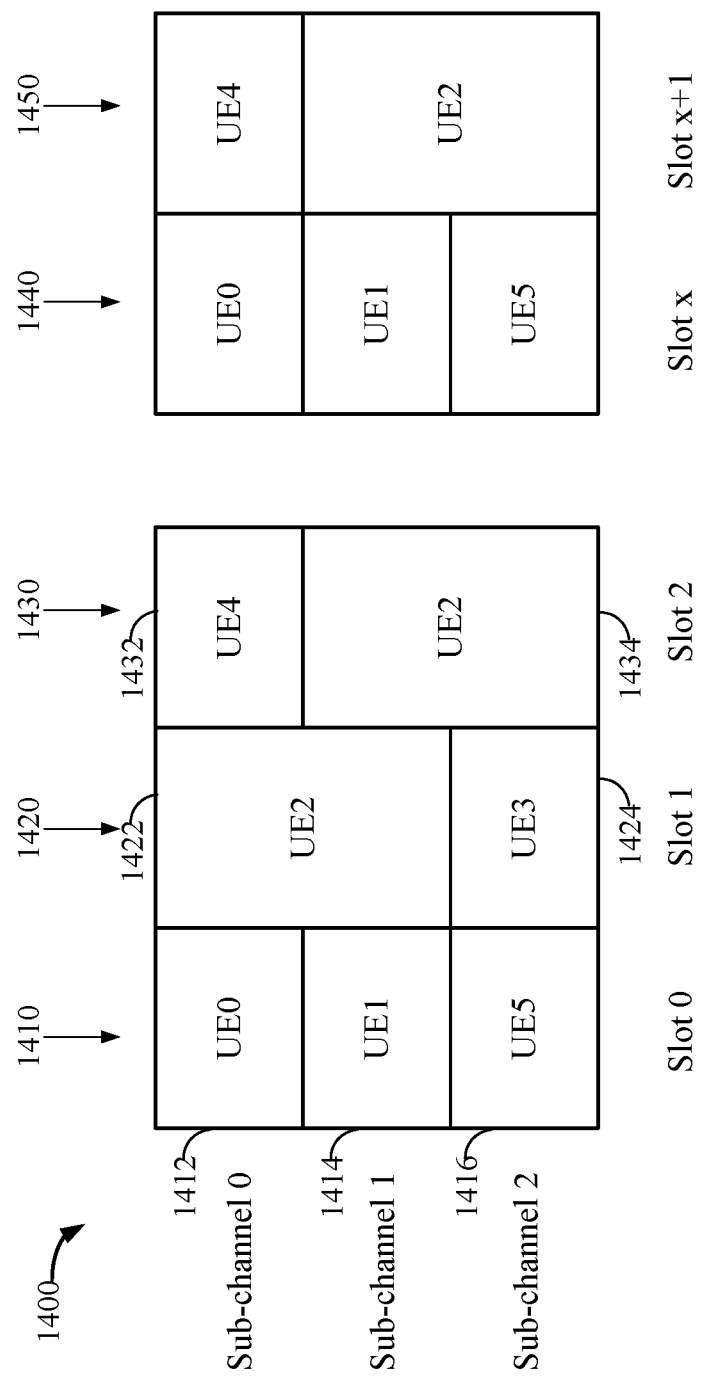
FIG. 14 is an exemplary transmission timeline illustrating sidelink communications with repeating of transmissions of some slots, in accordance with certain aspects of the present disclosure.

FIG. 14 is an example transmission timeline 1400 of sidelink communications between UEs (e.g., UEs 110, shown in FIG. 1), according to aspects of the present disclosure. In the exemplary transmission timeline, UEs 0, 1, 3, 4, and 5 transmit sidelink communications 1412, 1414, 1424, 1432, and 1416, respectively. Similarly, UE 2 transmits sidelink communications 1422 and 1434. In the exemplary transmission timeline, a wireless node (e.g., a UE or RSU, not shown) repeats the transmissions of slot 1410 in slot 1440. The wireless node also repeats the transmissions of slot 1430 in slot 1450.

In aspects of the present disclosure, a wireless node transmitting recovery information may be a UE designated the network (e.g., selected by a base station), a roadside service unit (RSU), a group leader, or a UE that received all the prior transmissions to be included in the parity slot.

According to some aspects of the present disclosure, a UE that reserves transmission resources in a recovery slot (e.g., a slot to be used for transmitting recovery information) may be selected to generate and transmit recovery information. That is, a UE (e.g., an RSU) may indicate to other devices that the UE is going to transmit recovery information by transmitting a SCI-1 reserving transmission resources in a recovery slot. The UE may be considered to have 'volunteered' to transmit recovery information.

With respect to the operations 900, the first UE may determine the other sidelink communication with an erasure code based on the sidelink communication and the recovery information. For example, the recovery information may include parity information from a parity check code and/or information from other suitable erasure codes, such as a Reed-Solomon code, an MDS code, and/or a Raptor code.

In certain aspects, groups of data blocks (e.g., transport blocks and/or code block groups) may be encoded using an erasure code for recovery of sidelink communications. At block 906, the first UE may decode the other sidelink communication with an erasure code based on the recovery information comprising a group of transport blocks encoded with the erasure code. For certain aspects, groups of payloads for sidelink control information may be encoded using an erasure code for recovery of sidelink communications. At block 906, the first UE may decode the other sidelink communication with an erasure code based on the recovery information comprising a group of payloads for sidelink control information encoded with the erasure code.

Figure 15:
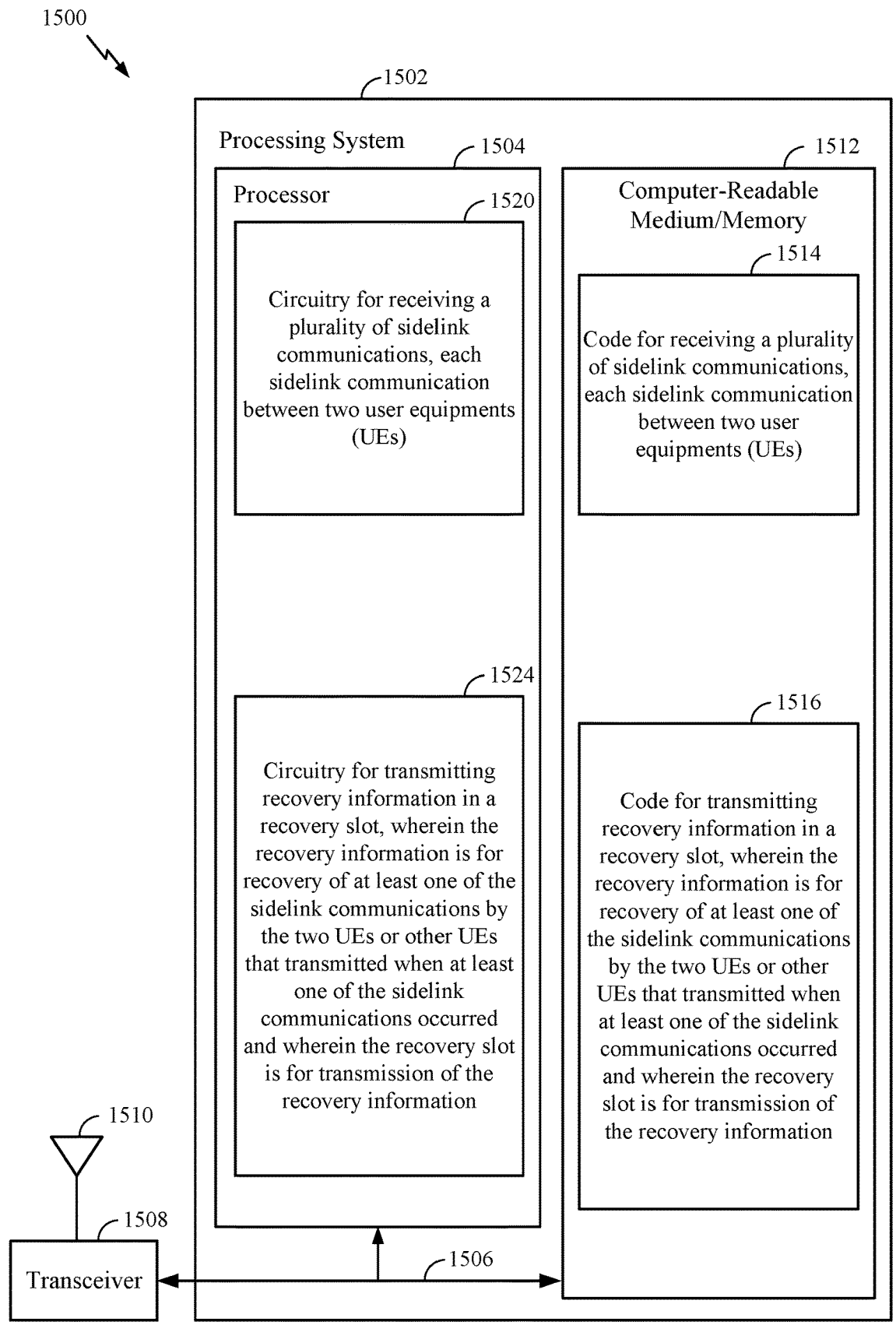
FIG. 15 illustrates a communications device (e.g., a wireless node) that may include various components configured to perform the operations illustrated in FIG. 8, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8, or other operations for recovering a sidelink communication that is received with errors or is missed by a wireless node, for example, due to the wireless node transmitting while the sidelink communication is occurring. In certain aspects, computer-readable medium/memory 1512 stores code 1514 for receiving a plurality of sidelink communications, each sidelink communication between two user equipments (UEs); and code 1516 for transmitting recovery information in a recovery slot, wherein the recovery information is for recovery of at least one of the sidelink communications by the two UEs or other UEs that transmitted when at least one of the sidelink communications occurred and wherein the recovery slot is for transmission of the recovery information. In certain aspects, the processor 1504 has circuitry configured to implement the code stored in the computer-readable medium/memory 1512. The processor 1504 includes circuitry 1520 for receiving a plurality of sidelink communications, each sidelink communication between two user equipments (UEs); and circuitry 1524 for transmitting recovery information in a recovery slot, wherein the recovery information is for recovery of at least one of the sidelink communications by the two UEs or other UEs that transmitted when at least one of the sidelink communications occurred and wherein the recovery slot is for transmission of the recovery information.

Figure 16:
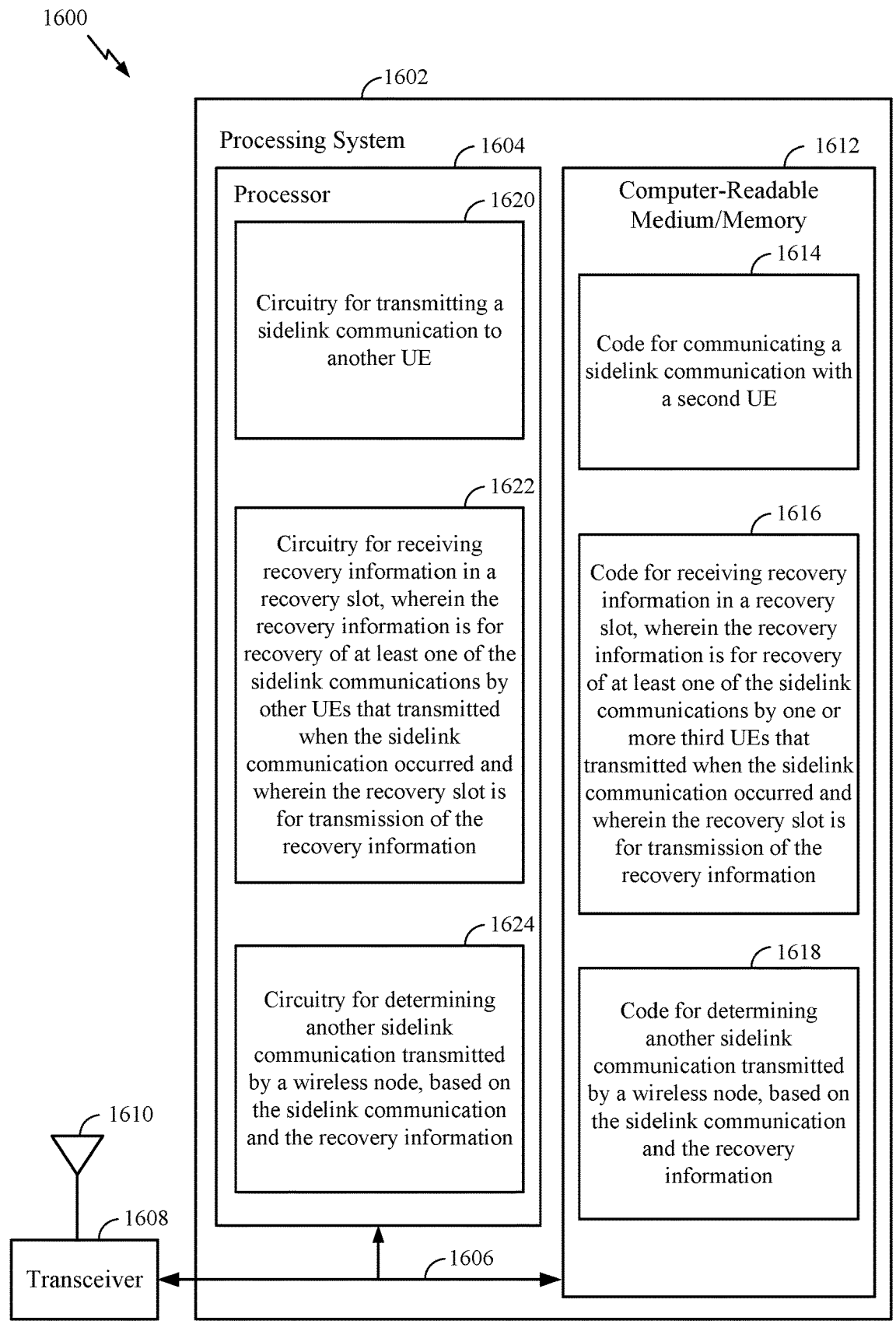
FIG. 16 illustrates a communications device (e.g., a UE) that may include various components configured to perform the operations illustrated in FIG. 9, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9 or other operations for performing the various techniques discussed herein for recovering a sidelink communication that is received with errors or is missed by a wireless node, for example, due to the wireless node transmitting while the sidelink communication is occurring. In certain aspects, computer-readable medium/memory 1612 stores code 1614 for communicating a sidelink communication with a second UE; code 1616 for receiving recovery information in a recovery slot, wherein the recovery information is for recovery of at least one of the sidelink communications by one or more third UEs that transmitted when the sidelink communication occurred and wherein the recovery slot is for transmission of the recovery information; and code 1618 for determining another sidelink communication transmitted by a wireless node, based on the sidelink communication and the recovery information. In certain aspects, the processor 1604 has circuitry configured to implement the code stored in the computer-readable medium/memory 1612. The processor 1604 includes circuitry 1620 for communicating a sidelink communication with a first UE; circuitry 1622 for receiving recovery information in a recovery slot, wherein the recovery information is for recovery of at least one of the sidelink communications by one or more second UEs that transmitted when the sidelink communication occurred and wherein the recovery slot is for transmission of the recovery information; and circuitry 1624 for determining another sidelink communication transmitted by a wireless node, based on the sidelink communication and the recovery information.

Example Aspects

In addition to the various aspects described above, specific combinations of aspects are within the scope of the disclosure, some of which are detailed below:

Aspect 1. A method for wireless communications by a wireless node, comprising: receiving a plurality of sidelink communications, each sidelink communication between two user equipments (UEs); and transmitting recovery information in a recovery slot, wherein the recovery information is for recovery of at least one of the sidelink communications by the two UEs or other UEs that transmitted when at least one of the sidelink communications occurred and wherein the recovery slot is for transmission of at least the recovery information.

Aspect 2. The method of Aspect 1, wherein the recovery information comprises parity information for the sidelink communications, and the method further comprises generating the parity information.

Aspect 3. The method of Aspect 2, wherein generating the parity information comprises using a maximum-distance separable (MDS) code to generate the parity information.

Aspect 4. The method according to any of Aspects 1-3, wherein each of the sidelink communications is in a sub-channel of a frequency band.

Aspect 5. The method of Aspect 4, wherein transmitting the recovery information comprises transmitting the recovery information in the sub-channel.

Aspect 6. The method according to any of Aspects 1-5, wherein each of the sidelink communications comprises a first stage sidelink control information (SCI-1).

Aspect 7. The method according to any of Aspects 1-5, wherein each of the sidelink communications comprises a first stage sidelink control information (SCI-1), wherein the sidelink communications are in a plurality of sub-channels of a frequency band, and wherein transmitting the recovery information comprises transmitting the recovery information in one sub-channel of the frequency band.

Aspect 8. The method according to any of Aspects 1-5, wherein each of the sidelink communications comprises a physical shared sidelink channel (PSSCH) and the method further comprises: grouping transport blocks (TBs) of the sidelink communications into a group of TBs; encoding the TBs in the group using a maximum-distance separable (MDS) code to generate the recovery information; and encoding the encoded group using a low-density parity check (LDPC) code to generate.

Aspect 9. The method of Aspect 8, wherein a cyclic redundancy check (CRC) is included in each of the TBs.

Aspect 10. The method according to any of Aspects 8 or 9, further comprising combining a cyclic redundancy check (CRC) from each of the TBs.

Aspect 11. The method according to any of Aspects 8 or 9, further comprising: removing a cyclic redundancy check (CRC) from each of the TBs; and generating a new CRC for a combination of the TBs.

Aspect 12. The method according to any of Aspects 8-11, wherein grouping the TBs comprises grouping one TB from one sidelink communication from each slot of a plurality of slots, wherein at least one of the sidelink communications occurred in each of the plurality of slots.

Aspect 13. The method according to any of Aspects 8-12, wherein grouping the TBs is based on a size of each of the TBs.

Aspect 14. The method according to any of Aspects 8-13, wherein grouping the TBs comprises adding zero-padding to at least one of the TBs.

Aspect 15. The method according to any of Aspects 8-14, wherein grouping the TBs is based on a layer one (L1) destination identifier (ID) of the each of the TBs.

Aspect 16. The method according to any of Aspects 8-15, wherein grouping the TBs is based on a sub-channel, of a frequency band, in which the sidelink communications are transmitted.

Aspect 17. The method according to any of Aspects 8-16, wherein grouping the TBs is based on a priority of each of the sidelink communications, wherein TBs of high-priority sidelink communications are excluded from the group.

Aspect 18. The method according to any of Aspects 8-17, wherein grouping the TBs is based on an indication in a signal.

Aspect 19. The method of Aspect 18, wherein the signal comprises a second stage sidelink control information (SCI-2).

Aspect 20. The method of Aspect 18, wherein the signal comprises a medium access control control element (MAC-CE).

Aspect 21. The method according to any of Aspects 1-20, further comprising: selecting the plurality of sidelink communications based on at least one of a priority of each sidelink communication, amount of remaining time in a packet delay budget (PDB), a cyclic redundancy check (CRC) pass state of each sidelink communication, or a transport block size (TB S) of each sidelink communication.

Aspect 22. The method according to any of Aspects 1-5 or 21, wherein each of the sidelink communications comprises a physical shared sidelink channel (PSSCH) and the method further comprises: grouping transport blocks (TBs) of the sidelink communications into a group of TBs; encoding each of the TBs in the group using a low-density parity check (LDPC) code to generate a group of LDPC-encoded TBs; and encoding each group of LDPC-encoded TBs using a maximum-distance separable (MDS) code to generate the recovery information.

Aspect 23. The method of Aspect 22, wherein encoding each of the TBs in the group using the LDPC code comprises encoding redundancy version (RV) 0 for each TB in the group.

Aspect 24. The method according to any of Aspects 1-5 or 21, wherein each of the sidelink communications comprises a physical shared sidelink channel (PSSCH) and are in a plurality of slots and wherein the recovery information comprises parity information, and the method further comprises: concatenating transport blocks (TBs) of one or more of the sidelink communications, which are in one slot of the plurality of slots, to form a group of TBs for each corresponding slot; padding each of the groups to form a padded group, wherein each padded group has a same size; and generating the parity information based on the padded groups.

Aspect 25. The method according to any of Aspects 1-5 or 21, wherein each of the sidelink communications comprises a second stage sidelink control information (SCI-2) and the method further comprises: grouping payloads of the SCI-2s into a group of payloads; encoding the payloads in the group using a maximum-distance separable (MDS) code to generate an encoded group; and encoding the encoded group using a polar code to generate the recovery information.

Aspect 26. The method according to any of Aspects 1-5 or 21, wherein each of the sidelink communications comprises a second stage sidelink control information (SCI-2) and the method further comprises: grouping payloads of the SCI-2s into a group of payloads; encoding each of the payloads in the group using a polar code to generate a group of polar-encoded payloads; and encoding each group of polar-encoded payloads using a maximum-distance separable (MDS) code to generate the recovery information.

Aspect 27. The method according to any of Aspects 1-5 or 21, wherein the plurality of sidelink communications is received in a slot and wherein the recovery information comprises a duplication of the plurality of sidelink communications.

Aspect 28. The method of Aspect 27, further comprising selecting the slot based on at least one of a number of high priority transmissions in the slot, a number of UEs impacted by missing the plurality of sidelink communications, a number of remaining retransmissions for TBs in the slot, or a proximity so a UE transmitting one of the sidelink communications.

Aspect 29. The method according to any of Aspects 1-28, wherein the wireless node comprises a roadside service unit (RSU).

Aspect 30. The method according to any of Aspects 1-28, wherein the wireless node comprises a group leader for sidelink communications.

Aspect 31. The method according to any of Aspects 1-28, wherein the wireless node comprises a UE that reserved transmission resources in the recovery slot.

Aspect 32. The method according to any of Aspects 1-31, further comprising combining a plurality of first stage sidelink control information (SCI-1) messages in the sidelink communications, wherein the recovery information includes the combined plurality of SCI-1 messages.

Aspect 33. A method for wireless communications by a user equipment (UE), comprising: transmitting a sidelink communication to another UE; receiving recovery information in a recovery slot, wherein the recovery information is for recovery of at least one of the sidelink communications by other UEs that transmitted when the sidelink communication occurred and wherein the recovery slot is for transmission of the recovery information; and determining another sidelink communication transmitted by a wireless node, based on the sidelink communication and the recovery information.

Aspect 34. An apparatus comprising means for performing the method of any of Aspects 1 through 33.

Aspect 35. An apparatus comprising at least one processor and a memory coupled to the at least one processor, the memory comprising code executable by the at least one processor to cause the apparatus to perform the method of any of Aspects 1 through 33.

Aspect 36. A computer readable medium storing computer executable code thereon for wireless communications that, when executed by at least one processor, cause an apparatus to perform the method of any of Aspects 1 through 33.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 8-9 may be performed by various processors shown in FIG. 4, such as processors 466, 458, 464, and/or controller/processor 480 of the UE 120a.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
  a receiver configured to receive a plurality of sidelink communications from a plurality of user equipments (UEs);
  a memory;
  a processor coupled to the memory, the processor and the memory being configured to:
    group payloads associated with the sidelink communications into a group of payloads, wherein at least one of the payloads includes sidelink control information (SCI), and
    generate recovery information based on the group of payloads; and a transmitter configured to transmit the recovery information in a recovery slot, wherein the recovery information is for recovery of the payloads associated with the sidelink communications, wherein the recovery slot is for transmission of at least the recovery information.

2. The apparatus of claim 1, wherein:
the processor and the memory are configured to generate parity information for the sidelink communications, wherein the recovery information comprises the parity information.

3. The apparatus of claim 2, wherein the processor and the memory are configured to generate the parity information with an erasure code.

4. The apparatus of claim 1, wherein the transmitter is configured to transmit the recovery information in a sub-channel of a frequency band, and each of the sidelink communications is in the sub-channel.

5. The apparatus of claim 1, wherein:
the sidelink control information comprises a first stage sidelink control information (SCI-1),
the sidelink communications are in a plurality of sub-channels of a frequency band, and
the transmitter is configured to transmit the recovery information in at least one of the sub-channels of the frequency band.

6. The apparatus of claim 1, wherein:
the processor and the memory are configured to:
group transport blocks (TBs) of the sidelink communications into a group of TBs,
encode the TBs in the group using an erasure code to generate the recovery information, and
encode the recovery information using a low-density parity check (LDPC) code, wherein each of the sidelink communications comprises a physical shared sidelink channel (PSSCH).

7. The apparatus of claim 6, wherein a cyclic redundancy check (CRC) is included in each of the TBs.

8. The apparatus of claim 6, wherein the processor and memory are configured to combine a cyclic redundancy check (CRC) from each of the TBs.

9. The apparatus of claim 6, wherein the processor and the memory are configured to:
remove a cyclic redundancy check (CRC) from each of the TBs, and
generate a new CRC for a combination of the TBs.

10. The apparatus of claim 6, wherein the processor and the memory are configured to group one TB from one sidelink communication from each slot of a plurality of slots, wherein at least one of the sidelink communications occurred in each of the plurality of slots.

11. The apparatus of claim 1, wherein:
the processor and the memory are configured to select the plurality of sidelink communications based on at least one of a priority of each sidelink communication, amount of remaining time in a packet delay budget (PDB), a cyclic redundancy check (CRC) pass state of each sidelink communication, or a transport block size (TBS) of each sidelink communication.

12. The apparatus of claim 1, wherein:
the processor and the memory are configured to:
group transport blocks (TBs) of the sidelink communications into a first group of TBs;
encode each of the TBs in the first group using a low-density parity check (LDPC) code to generate a second group of LDPC-encoded TBs; and
encode each of the TBs in the second group of LDPC-encoded TBs using an erasure code to generate the recovery information, wherein each of the sidelink communications comprises a physical shared sidelink channel (PSSCH).

13. The apparatus of claim 12, wherein the processor and the memory are configured to encode each of the TBs in the first group using the LDPC code with redundancy version (RV) 0.

14. The apparatus of claim 1, wherein:
the processor and the memory are configured to:
concatenate transport blocks (TBs) of one or more of the sidelink communications, which are in one slot of a plurality of slots, to form a group of TBs for each corresponding slot, wherein the sidelink communications are in the plurality of slots,
pad the group of TBs for each corresponding slot to form a padded group, wherein each of the padded groups has a same size, and
generate parity information for the recovery information based on the padded groups, wherein each of the sidelink communications comprises a physical shared sidelink channel (PSSCH).

15. The apparatus of claim 1, wherein:
the sidelink communications comprise first payloads of first stage SCI (SCI-1) and second payloads of second stage SCI (SCI-2); and
to group the payloads and generate the recovery information, the processor and the memory are further configured to:
group the second payloads of SCI-2 into at least a portion of the group of payloads,
encode the payloads in the group using an erasure code to generate an encoded group, and
encode the encoded group using a polar code to generate the recovery information.

16. The apparatus of claim 1, wherein:
the sidelink communications comprise first payloads of first stage SCI (SCI-1) and second payloads of second stage SCI (SCI-2); and
to group the payloads and generate the recovery information, the processor and the memory are further configured to:
group the second payloads of the SCI-2 into at least a portion of the group of payloads,
encode each of the payloads in the group using a polar code to generate a group of polar-encoded payloads; and
encode the group of polar-encoded payloads using an erasure code to generate the recovery information.

17. The apparatus of claim 1, wherein the plurality of sidelink communications is received in a slot and wherein the recovery information comprises a duplication of the plurality of sidelink communications.

18. The apparatus of claim 17, wherein:
the processor and the memory are configured to select the slot based on at least one of a number of high priority transmissions in the slot, a number of UEs impacted by missing the plurality of sidelink communications, a number of remaining retransmissions for TBs in the slot, or a proximity to a UE transmitting one of the sidelink communications.

19. The apparatus of claim 1, wherein:
to group the payloads, the processor and the memory are configured to combine a plurality of first stage SCI (SCI-1) messages received in the sidelink communications, wherein the group of payloads includes the combined plurality of SCI-1 messages.

20. An apparatus for wireless communications, comprising:
- a transceiver configured to:
  - communicate a sidelink communication with a first UE, and
  - receive recovery information in a recovery slot, wherein the recovery information is for recovery of at least one sidelink communication by one or more second UEs that transmitted when the sidelink communication occurred, wherein the recovery slot is for transmission of the recovery information, and wherein the sidelink communication includes sidelink control information;
- a memory; and
- a processor coupled to the memory, the processor and the memory being configured to:
  - determine another sidelink communication transmitted by a wireless node, based on the sidelink communication and the recovery information, and
  - decode the other sidelink communication with an erasure code based at least in part on the recovery information comprising a group of payloads for the sidelink control information encoded with the erasure code.

21. The apparatus of claim 20, wherein the recovery information further comprises parity information.

22. The apparatus of claim 20, wherein the recovery information further comprises a group of transport blocks encoded with the erasure code.

23. A method for wireless communications by a wireless node, comprising:
- receiving a plurality of sidelink communications from a plurality of user equipments (UEs);
- grouping payloads associated with the sidelink communications into a group of payloads, wherein at least one of the payloads includes sidelink control information;
- generating recovery information based on the group of payloads; and
- transmitting the recovery information in a recovery slot, wherein the recovery information is for recovery of the payloads associated with the sidelink communications, and wherein the recovery slot is for transmission of at least the recovery information.

24. The method of claim 23, wherein the recovery information comprises parity information for the sidelink communications, and the method further comprises generating the parity information with an erasure code.

25. The method of claim 23, wherein the sidelink control information comprises a first stage sidelink control information (SCI-1), wherein the sidelink communications are in a plurality of sub-channels of a frequency band, and wherein transmitting the recovery information comprises transmitting the recovery information in one sub-channel of the frequency band.

26. The method of claim 23, wherein each of the sidelink communications comprises a physical shared sidelink channel (PSSCH) and the method further comprises:
- grouping transport blocks (TBs) of the sidelink communications into a group of TBs;
- encoding the TBs in the group using an erasure code to generate the recovery information; and
- encoding the recovery information using a low-density parity check (LDPC) code.

27. A method for wireless communications by a first user equipment (UE), comprising:
- communicating a sidelink communication with a second UE;
- receiving recovery information in a recovery slot, wherein the recovery information is for recovery of at least one sidelink communication by one or more third UEs that transmitted when the sidelink communication occurred, wherein the recovery slot is for transmission of the recovery information, and wherein the sidelink communication includes sidelink control information;
- determining another sidelink communication transmitted by a wireless node, based on the sidelink communication and the recovery information; and
- decoding the other sidelink communication with an erasure code based at least in part on the recovery information comprising a group of payloads for the sidelink control information encoded with the erasure code.

28. The method of claim 27, wherein the recovery information further comprises parity information.

* * * * *